United States Patent [19]

Hall

[11] Patent Number: 5,759,212
[45] Date of Patent: Jun. 2, 1998

[54] PROCESS FOR COLORING SYNTHETIC TEXTILE MATERIALS

[75] Inventor: Nigel Hall, Greenmount, United Kingdom

[73] Assignee: Zeneca Limited, London, England

[21] Appl. No.: 693,290

[22] PCT Filed: Jan. 27, 1995

[86] PCT No.: PCT/GB95/00160

§ 371 Date: Aug. 15, 1996

§ 102(e) Date: Aug. 15, 1996

[87] PCT Pub. No.: WO95/23890

PCT Pub. Date: Sep. 8, 1995

[30] Foreign Application Priority Data

Mar. 2, 1994 [GB] United Kingdom ............ 9404020

[51] Int. Cl.[6] .................. D06P 3/26; D06P 3/54; D06P 3/72; D06P 3/85
[52] U.S. Cl. .............. 8/529; 8/662; 8/688; 8/690; 8/921; 8/922; 8/924
[58] Field of Search .............. 8/922, 506, 529–924

[56] References Cited

U.S. PATENT DOCUMENTS

| | | |
|---|---|---|
| 2,427,995 | 9/1947 | Parker et al. . |
| 2,576,037 | 11/1951 | Parker et al. . |
| 3,853,884 | 12/1974 | Troster ............... 252/301.26 |
| 3,980,651 | 9/1976 | Brack ............... 8/922 X |
| 4,116,623 | 9/1978 | Imahori et al. ............... 8/922 X |
| 4,159,192 | 6/1979 | Mockli ............... 8/922 X |
| 5,503,956 | 4/1996 | Kaszczuk et al. ............... 430/200 |

FOREIGN PATENT DOCUMENTS 54-50681   4/1979   Japan .

*Primary Examiner*—Margaret Einsmann
*Attorney, Agent, or Firm*—Pillsbury Madison & Sutro LLP

[57] ABSTRACT

A process for coloring a synthetic textile material or fiber blend thereof which comprises applying to the synthetic textile material a dye, which is free from water solubilizing groups, carrying at least one —$SO_2F$ group provided that the dye is not an azo, bisazo or anthraquinone dye.

1 Claim, No Drawings

PROCESS FOR COLORING SYNTHETIC TEXTILE MATERIALS

This application claims benefit of international application PCT/GB95/00160, filed Jan. 27, 1995.

The present invention relates to a process for colouring synthetic textile materials, to synthetic textiles when coloured, to a process for the mass coloration of plastics, to plastics when coloured, to certain novel dyes and to compositions containing dyes.

According to the present invention there is provided a process for coloring a synthetic textile material or fibre blend thereof which comprises applying to the synthetic textile material a dye, which is free from water solubilising groups, carrying at least one —$SO_2F$ group provided that the dye is not an azo, bisazo or anthraquinone dye.

The presence of one or more —$SO_2F$ groups in a dye molecule generally improves the properties of that dye and confers surprisingly good wet-fastness and light-fastness properties.

The synthetic textile material may be selected from secondary cellulose acetate, cellulose triacetate, polyamide, polyacrylonitrile and aromatic polyester. The synthetic textile material is preferably polyamide or aromatic polyester, such as polyhexamethylene adipamide or polyethylene terephthalate more preferably aromatic polyester and especially polyethlene terephthalate. Fibre blends may comprise mixtures of different synthetic textile materials or mixtures of synthetic and natural textile materials. Preferred fibre blends are those of polyester cellulose such as polyester-cotton. The textile materials or blends thereof may be in the form of filaments, loose fibres, yarn, woven or knitted fibres.

The present dyes preferably have low solubility in water, typically less than 1% preferably less than 0.5% and especially less than 0.2% solubility in water. The present dyes are thus free from water solubilising groups such as —$SO_3H$, —$CO_2H$, —$PO_3H$ and quaternary amino.

The dyes of the present invention as herein described optionally in admixture with each other and optionally in conjunction with other disperse dyes such as azo, bisazo or anthraquinone dyes may be applied to the synthetic textile materials or fibre blends thereof by methods which are conventionally employed in dyeing disperse dyes to such materials and fibre blends. For example, the dyes of the present invention in the form of an aqueous dispersion may be applied by dyeing, padding or printing processes using the conditions and additives conventionally used in carrying out such processes.

The process conditions may be selected from the following:

i) exhaust dyeing at a pH of from 4 to 6.5, at a temperature of from 125° C. to 140° C. for from 10 to 120 minutes and under a pressure of from 1 to 2 bar, a sequestrant may be optionally added;

ii) continuous dyeing at a pH of from 4 to 6.5, at a temperature of from 190° C. to 225° C. for from 15 seconds to 5 minutes, a migration inhibitor may optionally be added;

iii) printing direct at a pH of from 4 to 6.5, at a temperature of from 160° C. to 185° C. for 4 to 15 minutes for high temperature steaming, or at a temperature of from 190° C. to 225° C. for 15 seconds to 5 minutes for bake fixation with dry heat or at a temperature of from 120° C. to 140° C. and 1 to 2 bar for 10 to 45 minutes for pressure steaming, wetting agents and thickeners (such as alginates) of from 5 to 100% by weight of the dye may be optionally added;

iv) discharge printing (by padding the dye onto the textile material, drying and overprinting) at a pH of from 4 to 6.5, migration inhibitors and thickeners may optionally be added;

v) carrier dyeing at a pH of from 4 to 6.5, at a temperature of from 95° C. to 100° C. using a carrier such as methylnaphthalene, diphenylamine or 2-phenylphenol, sequesterants may optionally be added; and vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequesterants may optionally be added.

In all the above processes the dye is applied as a dispersion comprising from 0.00% to 4% of the dye in aqueous medium.

The present compounds generally provide coloured textile material which shows good fastness to washing, light and heat.

The dye may be a heterocyclic or carbocyclic compound and is preferably selected from one of the following dye classes benzothioxanthene, styryl, couimarn, naphtholactam, quinophthalone, aminodicyanobenzanthrone, pyrrole, thiophene-1,1-dioxide, benzodifuranone, isoindole, thiazole, triphenodioxazine, anthraisothiazolone, nitrodiphenylamine, isoquinolinone, isoquinolinedione, isoindoloperimidone and indoaniline.

Where the dye is a benzothioxanthene it is preferably of Formulae (2A), (2B) or (2C):

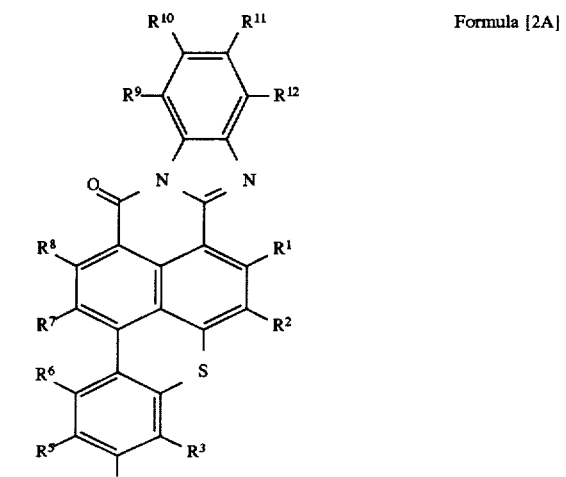

Formula [2A]

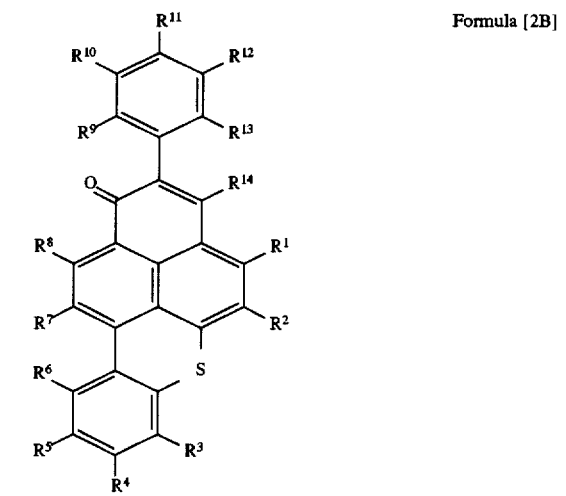

Formula [2B]

-continued

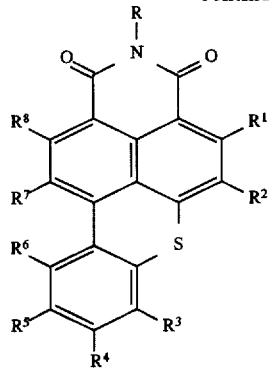

Formula [2C]

in which:

R is —H, alkyl or aryl in which the alkyl and aryl may be further substituted;

each of $R^1$ to $R^{13}$ independently is —H, —$NO_2$, —$SO_2F$, alkyl, alkoxy, —Saryl, halo, —$SO_2NHalkyl$ or —$SO_2NHaryl$; and $R^{14}$ is —H, alkoxy or —$SO_2F$.

Where A is a styryl dye it is preferably of Formula (3):

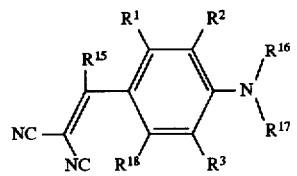

Formula [3]

in which:

$R^1$ to $R^3$ are as hereinbefore defined;

$R^{15}$ is —H or —CN;

each of $R^{16}$ and $R^{17}$ independently is —H, alkyl, cycloalkyl, aryl, alkenyl, aralkyl each of which may be optionally substituted or $R^{16}$ and $R^{17}$ together with the nitrogen atom to which they are attached form a pyrrolidino, piperidino or mrpholino ring; and $R^{18}$ is —H, alkyl, —$SO_2F$, —NHCOalkyl.

Where the dye is a coumarin dye it is preferably of Formulae (4A) or (4B):

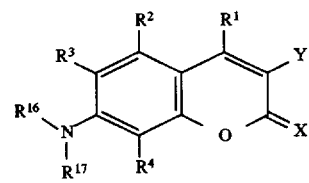

Formula [4A]

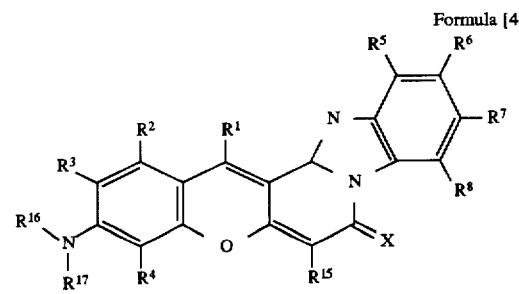

Formula [4B]

in which:

X is —O, —NH, —$NR^{16}$;

Y is

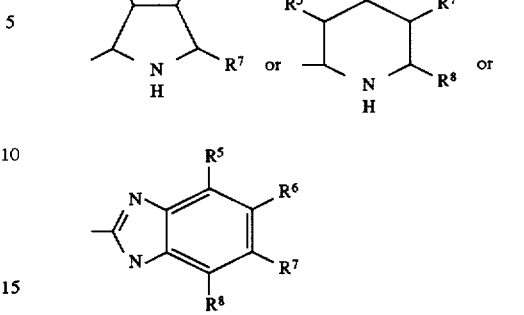

$R^1$ to $R^8$, $R^{15}$, $R^{16}$ and $R^{17}$ are as hereinbefore defined.

Where the dye is a naphtholactam dye it is preferably of Formulae (5A), (5B) or (5C):

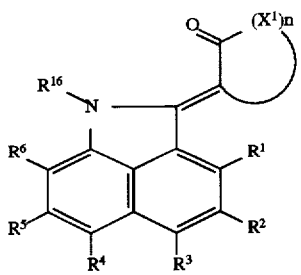

Formula [5A]

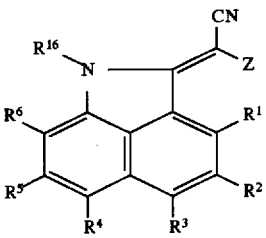

Formula [5CB]

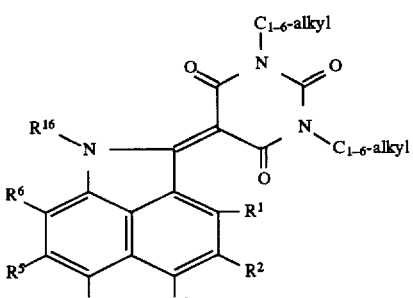

Formual [5C]

in which:

$X^1$ is a heteroatom;

n is 1 or 2;

Z is optionally substituted heteroaryl; and $R^1$ to $R^6$ and $R^{16}$ are as hereinbefore defined.

Where the dye is a quinophthalone dye it is preferably of Formula (6):

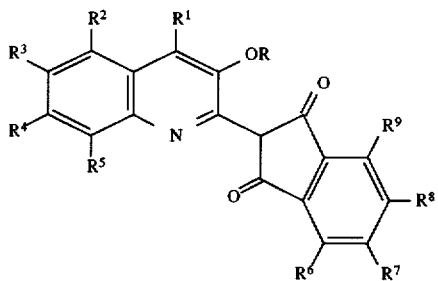

Formula [6]

in which:

R and $R^1$ to $R^9$ are as hereinbefore defined.

Where the dye is an aminodicyanobenzanthrone dye it is preferably of Formula (7):

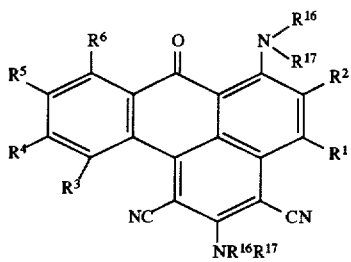

Formula [7]

in which:

$R^1$ to $R^6$, $R^{16}$ and $R^{17}$ are as hereinbefore defined.

Where the dye is a pyrrole dye it is preferably of Formulae (8A) or (8B):

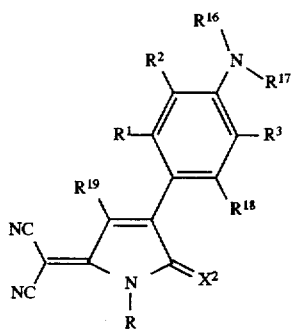

Formula [8A]

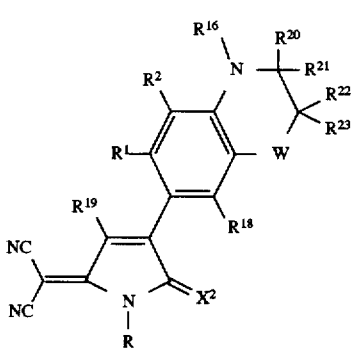

Formula [8B]

in which:

$X^2$ is O or S;

W is a direct link or —NR;

R, $R^1$ to $R^3$, $R^{16}$ and $R^{17}$ are as hereinbefore defined;

$R^{18}$ —H, alkyl, —NHCOalkyl;

$R^{19}$ is an electron withdrawing group; and each of $R^{20}$ to $R^{23}$ independently is —H, alkyl, cycloalkyl, aryl, alkenyl or aralkyl each of which may be optionally substituted.

Where the dye is a thiophene-1,1-dioxide dye it is preferably of Formulae (9A) or (9B):

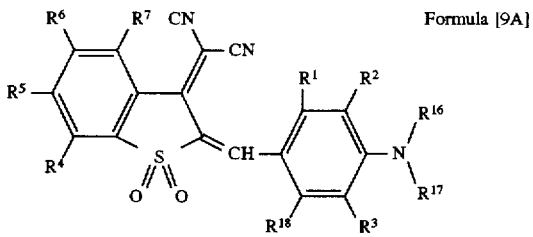

Formula [9A]

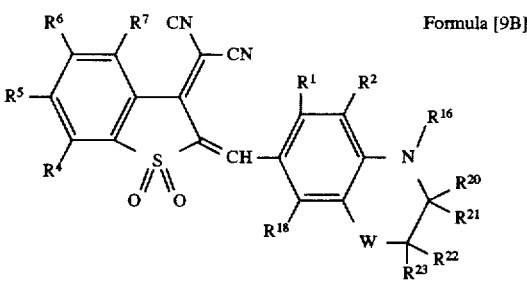

Formula [9B]

in which:

$R^1$ to $R^7$, $R^{16}$ to $R^{18}$, $R^{20}$ to $R^{23}$ and W are as hereinbefore defined.

Where the dye is a benzodifuranone dye it is preferably of the Formula (10):

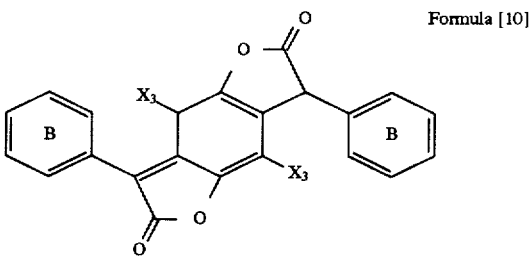

Formula [10]

in which:

each $X^3$ independently is —H, halo, —SO$_2$F, alkyl or alkoxy; and each Ring B independently is unsubstituted or is substituted by from 1 to 5 groups.

Where the dye is an isoindole dye it is preferably of Formula (11):

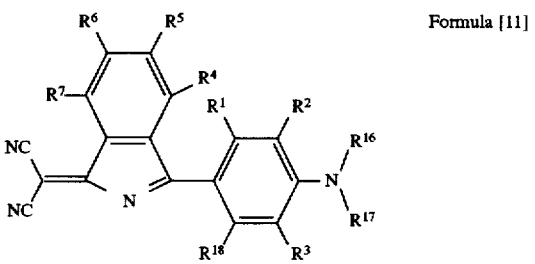

Formula [11]

in which:

$R^1$ to $R^7$ and $R^{16}$ to $R^{18}$ are as hereinbefore defined.

Where the dye is a thiazole dye it is preferably of Formula (12):

Formula [12]

in which:

X⁴ is CH or N; and $R^1$ to $R^3$, $R^5$ to $R^8$, $R^{11}$, $R^{16}$ to $R^{18}$ are as hereinbefore defined.

Where the dye is a triphenodioxazine dye it is preferably of Formula (13):

Formula [13]

in which:

$R^{24}$ and $R^{25}$ each independently is alkyl; and $R^1$ to $R^6$ and $R^{15}$ are as hereinbefore defined.

Where the dye is an anthraisothiazolone dye it is preferably Formula (14):

Formula [14]

in which:

$R^1$ to $R^6$ and $R^{16}$ are as hereinbefore defined.

$R^{26}$ is H, alkyl, cycloalkyl, aryl, aralkyl each of which may be optionally substituted or a group —COR in which R is as hereinbefore defined.

Where the dye is a nitrodiphenylamine it is preferably of Formula (15):

Formula [15]

in which:

$R^1$ to $R^{10}$ each independently is as hereinbefore defined provided that at least one of $R^1$ to $R^{10}$ is —NO₂.

Where the dye is an indoaniline it is preferably of Formulae (16A), (16B) or (16C):

Formula [16B]

Formula [16A]

Formula [16C]

in which:

R, $R^1$ to $R^{10}$, $R^{16}$ and $R^{17}$ are as hereinbefore defined.

Where the dye is an isoquinolinone it is preferably of Formula (23):

Formula [23]

in which:

$R^1$ to $R^{10}$ are as hereinbefore defined preferred dyes of Formula (23) are those in which $R^2$ is alkoxy, $R^3$ is —SO₂F and $R^1$, $R^4$ to $R^{10}$ are —H.

Wherein the dye is an isoquinolinedione it is preferably of Formula (24).

Formula [24]

in which $R^1$ to $R^6$, $R^{16}$ and $R^{17}$ are as hereinbefore defined. Preferred dyes of Formula (24) are those in which $R^1$, $R^3$ to $R^5$ and $R^{16}$ are H, $R^2$ is —SO₂F, $R^6$ is alkyl and $R^{17}$ is cycloalkyl.

Where the dye is an isoindoloperimidone it is preferably of Formula (25):

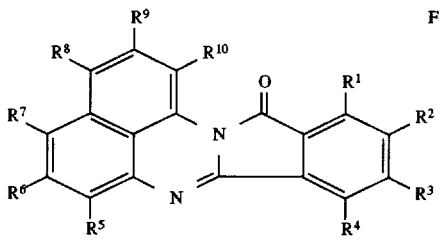

Formula [25]

in which $R^1$ to $R^{10}$ are as hereinbefore defined. Preferred dyes of Formula (25) are those in which $R^1$ to $R^{10}$ are —H or —$SO_2F$ more preferably those in which one of $R^1$ to $R^4$ is —$SO_2F$, one of $R^5$ to $R^7$ is —$SO_2F$ or one of $R^8$ to $R^{10}$ is —$SO_2F$.

The electron withdrawing group represented by $R^{15}$ is preferably —CN, —$SO_2F$, —COOalkyl, —CON(alkyl)$_2$ or —$SO_2$alkyl.

Where any of the groups represented by R, $R^1$ to $R^{14}$, $R^{16}$ to $R^{26}$ or $X^3$ is or contains alkyl or alkoxy the alkyl or alkoxy preferably contains from 1 to 10 and more preferably from 1 to 6 carbon atoms and may be straight or branched chain and may carry one or more substituents.

Where any of the groups represented by R, $R^1$ to $R^{13}$, $R^{16}$, $R^{17}$, $R^{20}$ to $R^{23}$ and $R^{26}$ is or contains aryl the aryl is preferably phenyl or naphthyl, more preferably phenyl and may carry one or more substituents.

The cycloalkyl group represented by $R^{16}$, $R^{17}$, $R^{20}$ to $R^{23}$ and $R^{26}$ is preferably $C_{5-7}$-cycloalkyl, more preferably cyclohexyl and may carry one or more substituents.

The alkenyl group represented by $R^{16}$, $R^{17}$ and $R^{20}$ to $R^{23}$ is preferably $C_{2-10}$-alkenyl, more preferably $C_{2-6}$-alkenyl and especially $C_{2-3}$-alkenyl which may be straight or branched chain and may carry one or more substituents.

The aralkyl group represented by $R^{16}$, $R^{17}$, $R^{20}$ to $R^{23}$ and $R^{26}$ is preferably phenyl$C_{1-6}$-alkyl, more preferably phenyl$C_{1-3}$-alkyl and especially benzyl, phenylethyl, chlorobenzyl or nitrobenzyl and may carry one or more substituents.

The halo group represented by $R^1$ to $R^{13}$ or $X^3$ is preferably —Cl, —Br or —I more preferably —Cl or —Br.

The heteroaryl group represented by Z is preferably pyridyl, thienyl, thiazolyl or isothiazolyl.

Where $X^1$ is a heteroatom it is preferably O or N.

Where any of the groups represented by R, $R^1$ to $R^{14}$, $R^{16}$ to $R^{26}$, Ring B, Z or $X^3$ is substituted by one or more substituents, suitable substituents may be selected from cyano, hydroxy, nitro, halo such as fluoro, chloro and bromo, fluorosulphonyl, trifluoromethyl, alkyl, alkoxy, aryl, (fluorosulphonyl)aryl), aryloxy, (fluorosulphonyl)aryloxy, —COalkyl, —NHCOalkyl, —NHSO$_2$alkyl, —OCOalkyl, —COOalkyl, —Salkyl, —Saryl, —SO$_2$alkyl, —SO$_2$aryl, $NR^{27}R^{28}$ in which $R^{27}$ and $R^{28}$ each independently is —H, cycloalkyl, alkyl or alkyl substituted by —OH, —CN, halo such as —F, —Cl and —Br, phenyl, —OCOalkyl, —COOalkyl,

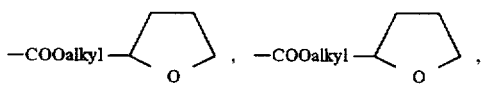

—OCOphenyl, —COOphenyl, alkyl (fluorosulphonylphenyl), —OCO(fluorosulphonylphenyl), alkenyl, —COOalkylOalkyl, —OalkylCN, aryloxy or —OalkylOCOalkylOalkyl, in which each alkyl is $C_{1-10}$-alkyl and each alkoxy is $C_{1-10}$-alkoxy each of which may be straight or branched chain and each alkyl, alkoxy, aryl or phenyl group may carry an —$SO_2F$ substituent or $R^{27}$ and $R^{28}$ together with the —N atom to which they are attached form a 5- or 6-membered ring such as morpholino or piperidino.

Preferred substituents are cyano, nitro, chloro, bromo, fluorosulphonyl, $C_{1-6}$-alkyl, $C_{1-6}$-alkoxy, —CO$C_{1-6}$-alkyl, —NHCO$C_{1-6}$-alkyl, —OCO$C_{1-6}$-alkyl, —COO$C_{1-6}$-alkyl, —$NR^{27}R^{28}$ in which $R^{27}$ and $R^{28}$ each independently is —H, $C_{1-6}$-alkyl or $C_{1-6}$-alkyl substituted by —OH, —CN, —Cl, phenyl, —OCO$C_{1-6}$-alkyl, —COO$C_{1-6}$-alkyl,

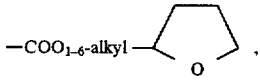

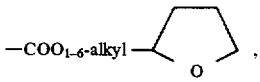

—$C_{1-4}$-alkyl (4-fluorosulphonylphenyl), —OCO(3-fluorosulphonylphenyl), —OCO(4-fluorosulphonylphenyl), —$C_{2-4}$-alkenyl, —COO$C_{1-6}$-alkylO$C_{1-6}$-alkyl, —O$C_{1-6}$-alkylCN or —O$C_{1-6}$-alkylOCO$C_{1-6}$-alkylO$C_{1-6}$-alkyl or where $R^{27}$ and $R^{28}$ together with the —N atom to which they are attached form a morpholino or piperidino.

The dyes of the present invention preferably carry a total of from one to three —$SO_2F$ groups, more preferably from one to two —$SO_2F$ groups and especially one —$SO_2F$ groups.

The dyes of Formulae (2) to (16) and (23) to (25) used in the above coloration process are novel and form a further feature of the present invention.

Compounds of Formulae (2) to (16) and (23) to (25) may be mixed with structurally similar compounds or the compounds of Formulae (2) to (16) and (23) to (25) may be mixed with dyes which do not contain an —$SO_2F$ group. The mixtures may be simple physical mixtures or may be mixed crystals formed for example by co-crystallisation. Such mixtures generally show improvement in dyeing properties. Crystalline modifications of compounds of Formulae (2) to (16) and (23) to (25) exist and it is intended that the present definition includes such crystalline modifications which may be formed by heat treatment.

Compositions comprising dispersions of the dyes of the present invention in aqueous media are novel and form a further feature of the present invention. The compositions typically comprise from 1% to 30% of dye and are preferably buffered at a pH from 2 to 7, more preferably at a pH from 4 to 6.

These dispersions may further comprise ingredients conventionally used in dyeing applications such as dispersing agents for example lignosulphonates, naphthalene sulphonic acid/formaldehyde condensates or phenol/cresol/sulphanilic acid/formaldehyde condensates, surfactants, wetting agents such as alkyl aryl ethoxylates which may be sulphonated or phosphated, inorganic salts, de-foamers such as mineral oil or nonanol, organic liquids and buffers. Dispersing agents may be present at from 10% to 200% on the weight of the compound of Formula (1). Wetting agents may be used at from 0% to 20% on the weight of the compound of Formula (1). The dispersions may be prepared by bead milling the compound of Formula (1) with glass beads or sand in an aqueous medium.

According to a further feature of the present invention there is provided a process for the mass coloration of plastics which comprises incorporating into a plastics material a dye except for azo, bisazo and anthraquinone dyes or mixture of dyes which is free from water solubilising groups and which carry at least one —$SO_2F$ group.

The plastics may be selected from polystyrene, acrylics, styrene/acrylonitrile mixtures, acrylonitrile/butadiene/styrene mixtures, polycarbonate, polyether-sulphone, nylons, rigid PVC (uPVC) and polypropylene.

The dye or dye mixture may be incorporated by blending with granules or powdered plastics material, by for example, dry tumbling or high-speed mixing followed by injection moulding on a screw machine or by conventional compounding/masterbatching techniques. The present dyes generally dissolve or disperse readily in hot plastics melt and provide bright coloration with good clarity and good light fastness.

The plastics material when coloured with the above dyes form a further feature of the present invention.

Fluorosulphonyl groups may be introduced into precursors of the dyes of Formulae (2) to (16) which are free of flourosulphonyl groups by methods generally available in the literature. For example reaction of such a precursor of a dye of Formulae (2) to (16) with chlorosulphonic acid optionally in the presence of dimethylformamide and thionylchloride at a temrperature of from 30° C. to 140° C. gives the chlorosulphonyl derivative. The cblorosulphonyl derivative may be reacted in boiling aqueous media with potassium fluoride to give the fluorosulphonyl derivative.

Alternatively the precursor of a dye of Formulae (2) to (16) may be sulphonated with sulphuric acid or oleum to give the sulphonic acid derivative which may be converted to the chlorosulphonyl derivative by reaction, either of the free acid or an inorganic salt thereof, with thionylchloride optionally in the presence of a chlorophosphorus compound such as phosphorus oxychloride or phosphorus pentachloride in an organic liquid such as an aromatic hydrocarbon at a temperature of from 20° C. to 110° C. Similarly a sulphonate ester may be converted to the corresponding chlorosulphonyl derivative. The chlorosulphonyl derivative may then be converted to the fluorosulphonyl derivative as described above.

The precursors of the dyes of Formulae (2) or (16) may be prepared by methods available in the literature.

Precursors of dyes of Formulae (2A), (2B) and (2C) may be prepared according to German patents 2238330 and 1569737.

Precursors of dyes of Formula (3) may be prepared according to German patent 2741392 and Japanese patents 59129264, 59129263, 59126466, 59230060 and 60031564.

Precursors of dyes of Formulae (4A) and (4B) may be prepared according to German patent 2415661 and Japanese patent 57031958.

Precursors of dyes of Formulae (5A), (5B) and (5C) may be prepared according to German patents 2341657, 2724566, 2608020, 2724567, 2606716, 2724540, 2724444, 2736914, 2924069 and 2611665.

Precursors of dyes of Formula (6) may be prepared by reaction of a naphthopyridine of Formula (17):

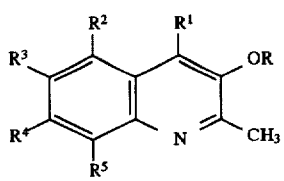

Formula [17]

with a phthalic anhydride of Formula (18):

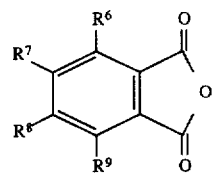

Formula [18]

in the presence of a Lewis acid catalyst such as zinc chloride optionally in an inert liquid medium at temperatures up to 220° C.

Precursors of dyes of Formula (7) may be prepared by reaction of an anthraquinone of Formula (19):

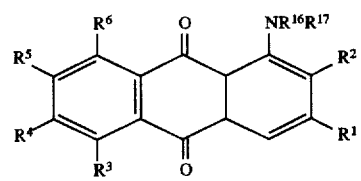

Formula [19]

with dicyanomethane in the presence of $TiCl_4$ and as described in EP 346280 followed by reaction, as appropriate, of the resultant amino compound with compounds of Formulae $R^{16}$-hal and $R^{17}$-hal in which $R^1$ to $R^6$, $R^{16}$ and $R^{17}$ are as hereinbefore defined and hal is —Cl, —Br or —I.

Precursors of dyes of Formulae (8A) or (8B) may be prepared according to UK patent 2191498 and Japanese patents 60150262 and 60156760.

Precursors of dyes of Formula (9A) or (9B) may be prepared according to German patent 2929001.

Precursors of dyes of Formula (10) may be prepared UK patent 1557205 and European patents 23080, 146269 and European patent application 363034.

Precursors of dyes of Formula (11) may be prepared according to German patent 2912428 and Japanese patent 59184262.

Precursors of dyes of Formula (12) may be prepared according to German patent 2732221 and Japanese patents 57030760 and 57030759.

Precursors of dyes of Formula (13) may be prepared according to German patent 2733539 and Japanese patents 53134971, 54068478, 53026826, 52140683, 52134634 and 52030823.

Precursors of dyes of Formula (14) may be prepared by reaction of an anthraquinone of Formula (20):

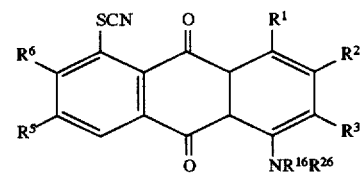

Formula [20]

in which $R^1$ to $R^3$, $R^5$, $R^6$, $R^{16}$, and $R^{26}$ are as hereinbefore defined with ammonium hydroxide at a temperature of 130° C.

Precursors of dyes of Formula (15) may be prepared by reaction of a chloronitrobenzene with an aniline.

Precursors of dyes of Formula (16) may be prepared by reaction of a nitroso compound of Formula (21):

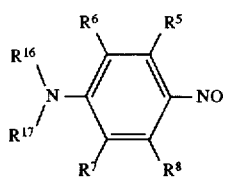

Formula [21]

with a hydroxy compound of Formula (22A), (22B) or (22C)

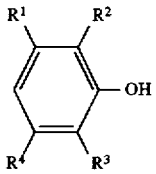

Formula [22A]

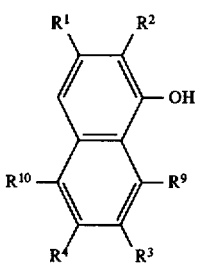

Formula [22B]

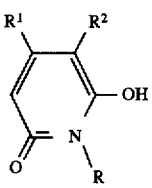

Formula [22C]

in the presence of acetic anhydride in which R, $R^1$ to $R^{10}$, $R^{16}$ and $R^{17}$ are as hereinbefore defined.

The precursor of the dye of Formula (23) in which $R^1$, $R^3$ to $R^{10}$ are —H and $R^2$ is methoxy is commercially available as C.I. Disperse Yellow 71. The precursor of the dye of Formula (24) in which $R^1$ to $R^5$ are —H, $R^6$ is methyl, $R^{16}$ is —H and $R^{17}$ is cyclohexyl is commercially available as C.I. Disperse Yellow 100. The precursor of the dye of Formula (25) in which $R^1$ to $R^{10}$ are —H is commercially available as C.I. Disperse Orange 24.

The dyes of Formulae (2) to (16) and (23) to (25) are useful for the coloration of synthetic textile materials particularly polyester textile materials and fibre blends thereof to which they impart colours which have excellent wet and light fastness properties.

The dyes of Formulae (2) to (16) and (23) to (25) are also useful for the mass coloration of plastics and impart bright colours generally with good clarity and light fastness.

EXAMPLE 1

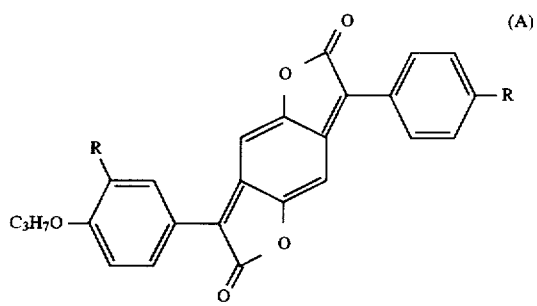

Dye A in which R=H (5 parts) was added to cooled concentrated sulphuric acid and stirred overnight at room temperature. The reaction mixture was poured into ice/water and the precipitate filtered off. The solid was washed with 10% brine and allowed to air dry before heating in pyridine (1240 parts) at 125° C. for 2.5 hours. After screening the hot mixture it was evaporated to dryness. The resulting solid was stirred in $POCl_3$ (215 parts) at 75° C. for 3 hours and for a further 24 hours at room temperature. Addition to ice/water was followed by filtration, yielding a solid which was washed with water and dried in a vacuum oven. Yield of product (1.7 parts) found to be a mixture of mono and disulphonyl chloride.

Potassium fluoride (3.4 parts) dissolved in water (277 parts) was added to 1,4-dioxane (290 parts) and stirred for 5 minutes before adding the sulphonyl chloride dye (0.84 parts). After stirring at room temperature for 1 hour at 75° C. and 1 hour at 120° C. the reaction mixture was carefully added to ice/water which was then extracted with ethyl acetate several times. The ethyl acetate was then dried over magnesium sulphate, filtered and concentrated to yield a mixture of dyes of formula A (0.6 parts) in which one R=H and the other R=$SO_2F$ and in which both R groups were $SO_2F$.

EXAMPLE 2

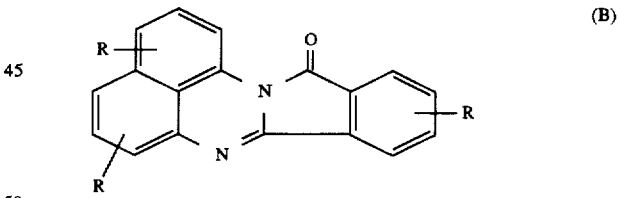

Dye B in which R=H (3.7 parts) was added to chlorosulphonic acid (188 parts) with stirring at room temperature. Thionyl chloride (13.7 parts) was then added and the reaction mixture heated at 80° C. for 24 hours. After cooling to room temperature, the reaction mixture was carefully drowned out into ice/water and left to stand overnight. Filtration yielded an orange solid which was washed with water then dried in a vacuum oven overnight.

The sulphonyl chloride dye (6 parts) was stirred in 1,4-dioxane (870 parts) while potassium fluoride (25.4 parts) in water (277 parts) was added in one portion, the mixture was heated at 120° C. for 30 hours, cooled to room temperature and filtered. The solid obtained was washed with water before drying at 50° C. to give a mixture of dyes of formula B in which one R=H and two R groups=$SO_2F$ and in which two R groups=H and one R=$S_2F$.

EXAMPLE 3

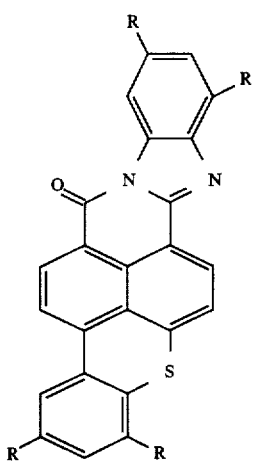
(C)

Dye C in which R=H (2.6 parts) was added to chlorosulphonic acid (226 parts) with stirring at room temperature. Thionyl chloride (13.7 parts) was then added and the reaction mixture heated at 55° C. for 2 hours. After cooling and pouring carefully into ice/water the resulting solution was filtered. The solid obtained was washed with water and dried in the vacuum oven overnight.

The sulphonyl chloride dye (2.6 parts) was stirred in 1,4-dioxane (580 parts) while potassium fluoride (3.4 parts) in water (277 parts) was added in one portion and the mixture was heated at reflux for 3 hours before cooling to room temperature and filtering. The filtrate was diluted with water and re-filtered. The collected solids were combined, washed with water and dried at 50° C. overnight to give a mixture of dyes of formula C (2.5 parts) in which one, two and three R groups=$SO_2F$.

EXAMPLE 4

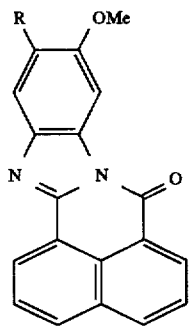
(C)

Dye D in which R=H (6.7 parts) was added to chlorosulphonic acid (226 parts) with stirring at room temperature. Thionyl chloride (20.5 parts) was added and the reaction mixture heated at 80° C. for 3 hours. After cooling to room temperature the mixture was carefully drowned out in ice/water and the resulting solid filtered off. The solid was washed with water and dried under vacuum overnight.

The dry solid (4.4 parts) was stirred in 1,4-dioxane (870 parts) while potassium fluoride (8.5 parts) dissolved in water (277 parts) was added in one portion and the mixture was heated at reflux for 3 hours before cooling to room temperature and filtering. The solid was washed with water and dried under vacuum overnight to give dye D in which R=$SO_2F$.

EXAMPLE 5

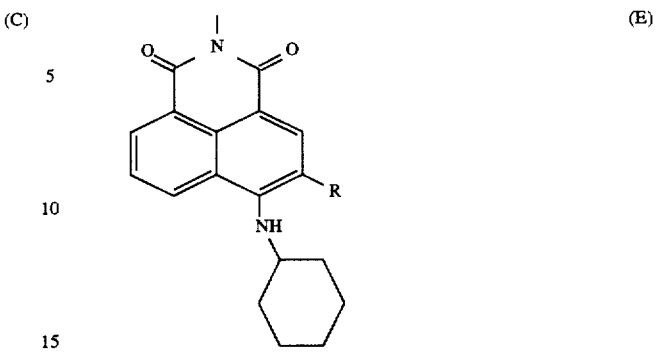
(E)

Dye E in which R=H (2.4 parts) was added to chlorosulphonic acid (150 parts) with stirring at room temperature. Thionyl chloride (10.3 parts) was added and the mixture heated at 70° C. for 3–4 hours. After cooling to room temperature the mixture was carefully drowned out in ice/water and the resulting solid filtered off. The solid was washed with water and dried under vacuum overnight.

The sulphonyl chloride dye (0.5 parts) was stirred in 1,4-dioxane (290 parts) while potassium fluoride (1.7 parts) dissolved in water (227 parts) was added in one portion and the mixture was heated at reflux for 2–3 hours before cooling to room temperature and carefully drowning in water. The precipitate was filtered off, washed with water and dried under vacuum overnight, to give dye E (0.01 parts) in which R=$SO_2F$.

EXAMPLE 6

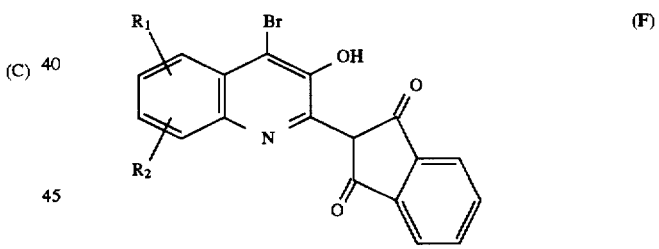
(F)

Dye F in which $R_1$ and $R_2$=H (10 parts) was added to a stirred mixture of chlorosulphonic acid (376 parts) and thionyl chloride (68.5 parts) at room temperature. The reaction mixture was heated at 100° C. for 4 hours. After cooling to room temperature the mixture was carefully poured into ice/water and the precipitate filtered off. The solid was washed with water and dried under vacuum to give the sulphonyl chloride derivative.

1,4-dioxane (58 parts)/potassium fluoride (5.9 parts)/water (27.7 parts) were stirred together before the sulphonyl chloride derivative (0.75 parts) was added. The reaction mixture was heated at 70° C. for 20 hours. After cooling to room temperature the solution was filtered and the resulting solid obtained washed with water. The solid as dried under vacuum overnight to yield a mixture of sulphonyl fluoride containing dyes (0.2 parts) of structure F in which $R_1$=Cl, $R_2$=$SO_2F$, and in which $R_1$=$R_2$=$SO_2F$.

EXAMPLE 7

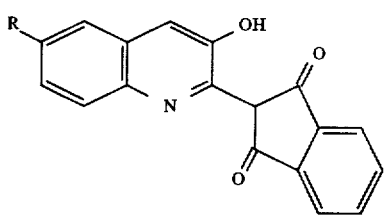

(G)

Dye G in which R=H (2 parts) was added to chlorosulphonic acid (300 parts) at room temperature then heated at 50° C. for 3 hours. After cooling, the reaction mixture was poured into ice/water and the precipitate formed filtered off. The solid was washed with water several times before being dried under vacuum, yielding the sulphonyl chloride derivative (1.45 parts).

The potassium fluoride (10 parts)/water (22 parts)/1,4-dioxane (23.2 parts) were stirred together before the sulphonyl chloride derivative (1.25 parts) was added in one portion. The reaction mixture was heated at 60° C. for 5 hours, cooled and filtered. After washing with water and drying overnight under vacuum at 50° C. a dye (0.03 parts) of structure G in which R=SO$_2$F was obtained.

EXAMPLE 8

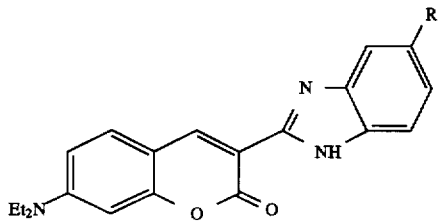

(H)

Dye H in which R=H (0.75 parts) was added to chlorosulphonic acid (300 parts) at room temperature then heated at 70° C. for 5 hours. After cooling, the reaction mixture was poured into ice/water and the precipitate formed filtered off. The solid was washed with water several times before being dried under vacuum, yielding the sulphonyl chloride dye.

The potassium fluoride (5.1 parts)/water (111 parts)/p-dioxane (93 parts) were stirred together before the sulphonyl chloride dye (0.6 parts) was added and the reaction mixture was heated at 60° C. for 5–6 hours. On cooling, the solution was filtered and the solid washed with water. After drying the solid overnight at 50° C., purification was carried out using flash chromatography (eluent: dichloromethane/ethyl acetate) to give dye in which R=SO$_2$F.

EXAMPLE 9

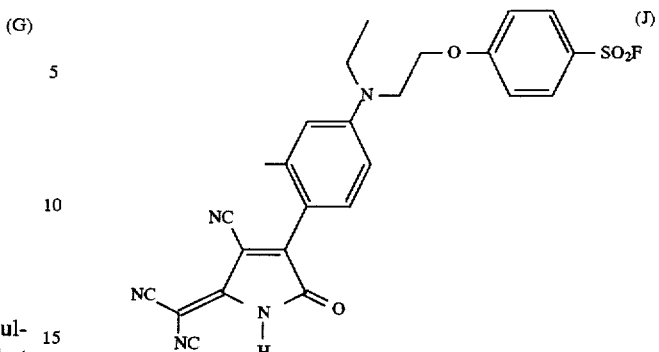

(J)

The di-sodium salt of 4-cyano-5-dicyanomethylidene-3-hydroxy-2-oxo-2, 5-dihydropyrrole (10 parts) was dissolved in DMF (388 parts). N-Ethyl-N-β-(4-fluorosulphonylphenoxy)-ethyl-m-toluidine (10 parts) was then added at 0° C., followed by the dropwise addition of POCl$_3$ (24 parts). After the reaction exothermed slightly, stirring was continued at 0° C. for 30 minutes followed by 2 hours at room temperature. The reaction mixture was carefully drowned out in ice/water, filtered and the solid obtained washed with water before drying at 40° C. The dye was dissolved in an acetone (2 parts)/methanol (5 parts) mixture before pouring into water (27 parts). The solid filtered off was washed with water and dried at 50° C., yielding dye J (3.4 parts). $\lambda_{max}$ 637 nm.

EXAMPLE 10

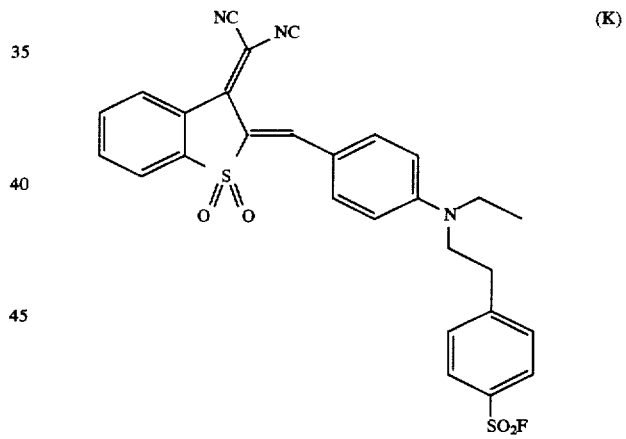

(K)

N-Ethyl-N-(2-(4-fluorosulphonylphenyl)ethyl)-aniline (12.5 parts) was dissolved in DMF (323 parts) and cooled to 0° C. before adding POCl$_3$ (32 parts) dropwise. The reaction mixture was heated at 80° C. for 3 hours, cooled to room temperature and carefully drowned out into ice/water. The aqueous solution was neutralised with concentrated sodium hydroxide and then extracted with toluene (5×500mls). The toluene extracts were combined, dried over MgSO4 and concentrated on a rotary evaporator to yield the aldehyde intermediate (10.5 parts).

The aldehyde intermediate (3 parts) and 3-dicyanomethylidene-2, 3-dihydrobenzothiophene-1,1-dioxide (3.3 parts) were refluxed in ethanol (170 parts) for 4 hours. On cooling the solvent was removed on the rotary evaporator and the dye purified by column chromatography (eluent: dichloromethane) to yield dye K (0.1 parts). $\lambda_{max}$ 581nm.

EXAMPLE 11

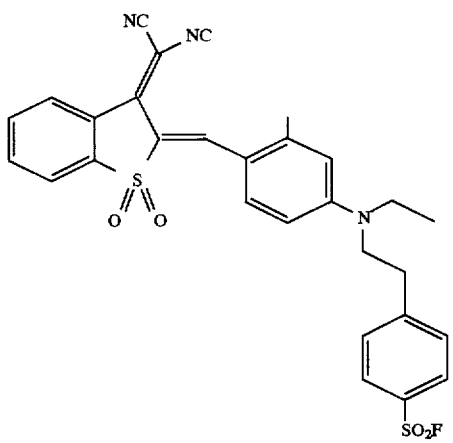
(L)

The procedure for example 10 was repeated except that in place of 12.5 parts of N-ethyl-N-(2-(4-fluorosulphonylphenyl)ethyl)-aniline; 12.5 parts of N-ethyl-N-(4-fluorosulphonyl-phenyl ethyl)-m-toluidine was used to yield dye L (0.12 parts). $\lambda_{max}$ 596nm.

EXAMPLE 12

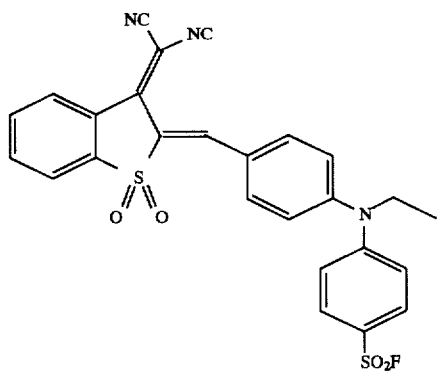
(M)

The procedure for example 10 was repeated except that in place of 12.5 parts of N-ethyl-N-(2-(4-fluorosulphonylphenyl)ethyl)-aniline; 12.5 parts of N-ethyl-N-(4-fluorosulphonyl-benzyl)-aniline was used to yield dye M (0.6 parts). $\lambda_{max}$ 566nm.

EXAMPLE 13

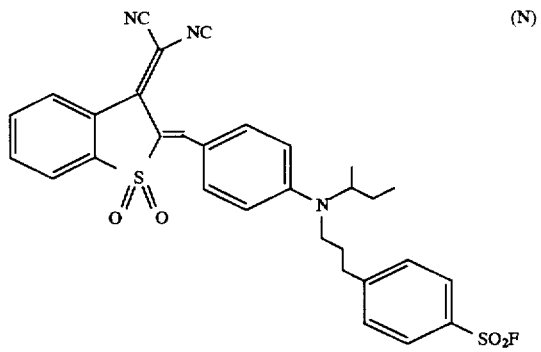
(N)

The procedure for example 10 was repeated except that in place of 12.5 parts of N-ethyl-N-(2-(4-fluorosulphonylphenyl)ethyl)-anilne; 12.5 parts of N-isobutyl-N-(3-(4-fluorosulphonylphenyl)propyl)-m-toluidine was used to yield dye N (0.08 parts). $\lambda_{max}$ 607nm.

I claim:

1. A process for coloring a synthetic textile material selected from secondary cellulose acetate, cellulose triacetate, polyamide, polyacrylonitrile and aromatic polyester, or fiber blend thereof which comprises applying to the synthetic textile material a dye in the form of an aqueous dispersion, said dye containing at least one $SO_2F$ group and being free of water solubilizing groups and being selected from the group consisting of aminodicyanobenzanthrones, anthraisothiazolones, benzodifuranones, benzothioxanthenes, coumarins, indoanilines, isoindoloperimidones, isoindoles, isoquinolines, isoquinolinediones, naphtholactams, nitrodiphenylamines, pyrroles, styryls, thiophene-1, 1-dioxides, thiazoles and triphenodioxazines.

* * * * *